Patented Nov. 30, 1937

2,100,531

UNITED STATES PATENT OFFICE 2,100,531

MIXED CHLORO-FLUORO ANTHRAQUINONE ACRIDONES

Alexander J. Wuertz, Carrollville, and William Dettwyler, Milwaukee, Wis., assignors to E. I. du Pont de Nemours & Company, Wilmington, Del., a corporation of Delaware No Drawing. Application March 16, 1935, Serial No. 11,417

4 Claims. (Cl. 260—37)

This invention relates to the preparation of new chloro-fluoro compounds of anthraquinone-2,1-benz-acridone, which are useful as dyestuffs and also serve as valuable intermediates for the preparation of other dyestuffs.

According to our invention, Bz-fluoro-anthraquinone - 2,1 - benz - acridones or Bz - trifluoromethyl - anthraquinone -2,1-benz - acridones are halogenated to produce mixed halogen anthraquinone-acridones which themselves serve as dyestuffs, giving bluer shades than the corresponding chloro or bromo compounds. These mixed halogen derivatives are also valuable for the preparation of other dyestuffs. The Bz-fluoro-anthraquinone - 2,1 - benz - acridones and the Bz-trifluoromethyl-anthraquinone-2,1-benz-acridones are prepared by condensing a fluoroaniline compound with 1-chloroanthraquinone-2-carboxylic acid in the presence of an acid binding agent, such as soda ash, and a copper catalyst. The resulting compounds are then ringclosed to the acridones by the usual methods, such as by treatment with benzoyl chloride, benzotrichloride, thionyl chloride, acetyl chloride, phosphorus pentachloride, etc., as more particularly described in U. S. application 11,418 filed of even date herewith.

The halogenation of these fluoro compounds may be effected by any of the known methods, using chlorine or bromine in the free state or substances which under the conditions of the reaction liberate such halogens. The halogenation may be carried out in sulfuric acid, chlorosulfonic acid, etc., or in inert organic solvents, or sulfuryl chloride can be used as the solvent and chlorinating agent.

The following examples are given to more fully illustrate our invention. Parts used are by weight.

Example 1

15 parts of Bz4-fluoro-anthraquinone-2,1-benz-acridone (as obtained by condensation of para - fluoro - aniline with 1-chloro - anthraquinone-2-carboxylic acid followed by ring-closure) are suspended in 150 parts of nitrobenzene. 0.1 part of iodine is added and the mass heated to 100° C. Chlorine gas is passed in at this temperature until a sample contains 17–18% chlorine. It is cooled, filtered and washed. The product is a dark red powder, soluble in concentrated sulfuric acid with a red orange color, and dyes cotton in red violet shades from a blue violet vat.

Example 2

Chlorine gas is passed into a suspension of 20 parts of Bz-para-fluoro-anthraquinone-2,1-benz-acridone in 200 parts of ortho-dichlorobenzene at 165° C. in the presence of 0.1 part of iodine until a sample contains 2 chlorine atoms. The product is isolated by filtration after cooling. It is a red powder, having a red orange colored solution in sulfuric acid and dyes cotton pink shades from a violet vat.

Example 3

20 parts of Bz3-trifluoromethyl-anthraquinone-2,1-benzacridone are suspended in 200 parts of nitrobenzene, 0.1 part of iodine is added and the mass heated to 100° C. Chlorine gas is then passed in at this temperature until a sample contains 20–21% chlorine, which corresponds to 3 chlorine atoms. The mass is cooled, filtered and washed. The product is a bright red powder soluble in concentrated sulfuric acid with a red orange color and dyes cotton in red violet shades from a blue violet vat.

Example 4

17 parts of Bz3-trifluoromethyl-anthraquinone-2,1-benzacridone are dissolved in 250 parts of chlorosulfonic acid, 0.1 part of iodine is added and chlorine gas is passed in at room temperature until a sample contains 27% chlorine. This corresponds to 4 chlorine atoms. The mass is poured onto ice, filtered and washed acid free. The product consists of a bright red powder, soluble in concentrated sulfuric acid with a red orange color and dyes cotton in bright pink shades from a blue violet vat.

As illustrated in the examples above given, as high as 4 atoms of chlorine may be introduced into the molecule. The exact position of the chlorine atoms is not known, although it is believed that at least 2 of the chlorine atoms enter the benzene ring. However, we do not wish to be limited to any specific formula.

What we claim is:

1. Mixed halogen-anthraquinone-2,1-benzacridones of the following general formula:

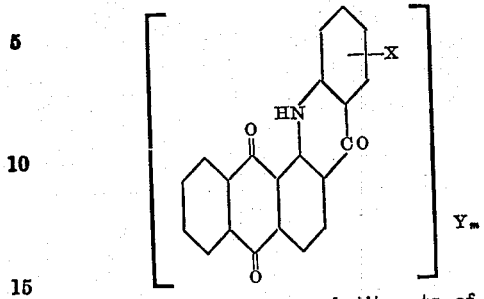

wherein X stands for substituents of the class consisting of $F_n$ and $CF_3$ wherein $n$ stands for a number not greater than 2, Y stands for a halogen of the class consisting of bromine and chlorine and $m$ stands for a number not greater than 4.

2. Mixed halogen-anthraquinone-2,1-benzacridones of the following general formula:

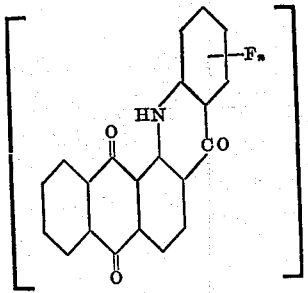

wherein $n$ stands for a number not greater than 2, Y stands for a halogen of the class consisting of bromine and chlorine and $m$ stands for a number not greater than 4.

3. A mixed halogen-anthraquinone-2,1-benzacridone of the following general formula

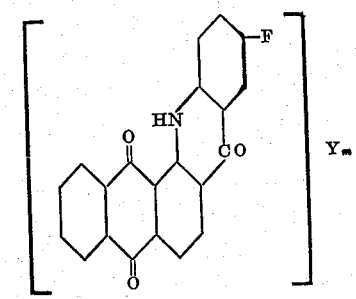

wherein Y stands for a halogen of the class consisting of bromine and chlorine and $m$ stands for a number not greater than 4.

4. Mixed halogen-anthaquinone-2,1-benzacridones of the following general formula:

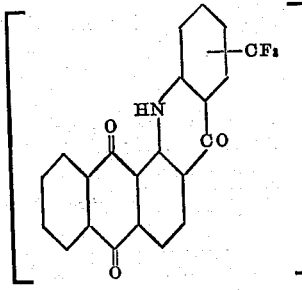

wherein Y stands for a halogen of the class consisting of bromine and chlorine and $m$ stands for a number not greater than 4.

ALEXANDER J. WUERTZ.
WILLIAM DETTWYLER.